United States Patent

Düwel et al.

[11] 3,928,375
[45] Dec. 23, 1975

[54] ANTHELMINTICALLY ACTIVE 2-CARBALKOXY-AMINO-BENZIMIDAZOLYL-5(6)-AMINO-PHENYL ETHERS

[75] Inventors: Dieter Düwel, Hofheim, Taunus; Reinhard Kirsch, Niederjosbach, Taunus; Heinz Loewe, Kelkheim, Taunus; Josef Urbanietz, Schwalbach, Taunus, all of Germany

[73] Assignee: Hoechst Aktiengesellschaft, Frankfurt am Main, Germany

[22] Filed: Sept. 23, 1974

[21] Appl. No.: 508,337

[30] Foreign Application Priority Data
Sept. 25, 1973 Germany.............................. 2348104

[52] U.S. Cl........ 260/309.2; 260/562 R; 260/562 B; 260/562 A; 260/562 P; 424/273
[51] Int. Cl.²......................................... C07D 235/32
[58] Field of Search................................ 260/309.2

[56] References Cited
UNITED STATES PATENTS
3,574,845   4/1971   Actor et al....................... 260/309.2

OTHER PUBLICATIONS
Loewe et al., Chem. Abst., 1973, Vol. 73, No. 92217h.

Primary Examiner—Natalie Trousof
Attorney, Agent, or Firm—Curtis, Morris & Safford

[57] ABSTRACT

The invention describes novel 2-carbalkoxy-amino-benzimidazolyl-5(6)-amino-phenyl ether of the formula (I)

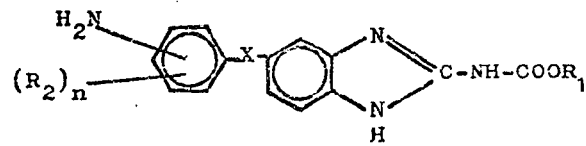

(I)

wherein $R_1$ is alkyl having 1 to 4 carbon atoms, $R_2$, in each case independently from one another, represents hydrogen, alkyl having 1 to 4 carbon atoms, hydroxyl, alkoxy having 1 to 4 carbon atoms, halogen or trifluoromethyl, n represents the integers 0, 1 or 2 and X represents oxygen or sulfur, the salts of such compounds with physiologically tolerable salts and their preparation. These compounds are chemotherapeutics and act particularly against helminths in humans and animals.

7 Claims, No Drawings

ANTHELMINTICALLY ACTIVE 2-CARBALKOXY-AMINO-BENZIMIDAZOLYL-5(6)-AMINO-PHENYL ETHERS

2-Carbalkoxy-amino-benzimidazolyl derivatives with alkyl, acyl, phenoxy and phenylthio radicals in 5(6)-position are known as anthelmintics (P. Actor et al., Nature 215, 321 (1967); German Offenlegungsschrift No. 2,029,637; German Offenlegungsschrift No. 2,164,690).

The present invention relates to anthelmintically active 2-carbalkoxy-amino-benzimidazolyl-5(6)-amino-phenyl ethers of the formula (I)

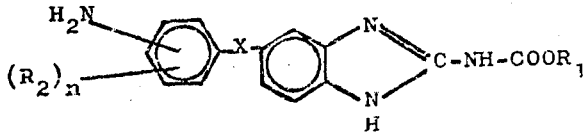

wherein $R_1$ is alkyl having 1 to 4 carbon atoms, $R_2$, in each case independantly from one another represents hydrogen, alkyl having 1 to 4 carbon atoms, hydroxyl, alkoxy having 1 to 4 carbon atoms, halogen or trifluoro-methyl, $n$ represents the integers 0, 1 or 2 and X is oxygen or sulfur, as well as the salts of these compounds with physiologically tolerable acids, such as hydrochloric aacid, sulfuric acid, phosphoric acid, acetic acid, succinic acid, tartaric acid and other acids.

Especially preferred are compounds of the formula (I), wherein $R_1$ is methyl, $R_2$ is hydrogen and X is oxygen or sulfur.

As alkyl radicals in the substituents $R_1$ and $R_2$ there are considered: methyl, ethyl, propyl, isopropyl, butyl, secundary butyl, tertiary butyl. As alkoxy groups in the substituent $R_2$ are considered: methoxy, ethoxy, propoxy, isopropoxy and butoxy. As halogen atoms in the substituent $R_2$ are considered: fluorine, chlorine, bromine, iodine.

The present invention also provides a process for preparing 2-carbalkoxy-amino-benzimidazolyl-5(6)-amino-phenyl-ethers of the formula (I), wherein $R_1$, $R_2$, $n$ and X have the above meaning, which comprises condensing an o-phenylene-diamino derivative of the formula (VII), wherein $R_2$, $n$ and X have the same meaning as in formula (I), and $R_3$ stands for alkyl having 1 to 4 carbon atoms or for a $CF_3$-radical, either a. with an alkyl-S-methyl-thio-urea-carboxylate of the formula (IV), wherein $R_1$ has the same meaning as in formula (I), or b. with a cyanamide-carboxylate of the formula (VI), wherein $R_1$ has the same meaning as in formula (I), in each case in a pH-range of 1 to 6, preferably 2 to 5, and saponifying the 2-carbalkoxy-amino-benzimidazolyl-5(6)-acetamino-phenyl ethers thus obtained of the formula (VIII). If desired, the compounds of formula VIII are converted into the corresponding salts by addition of a physiologically tolerable acid.

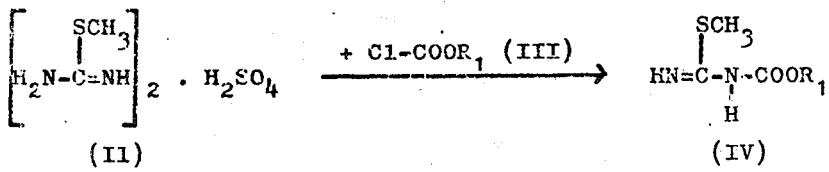

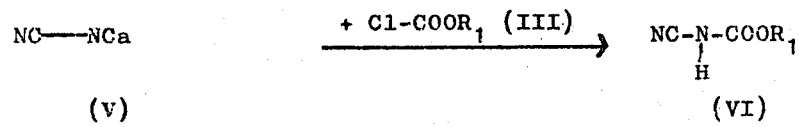

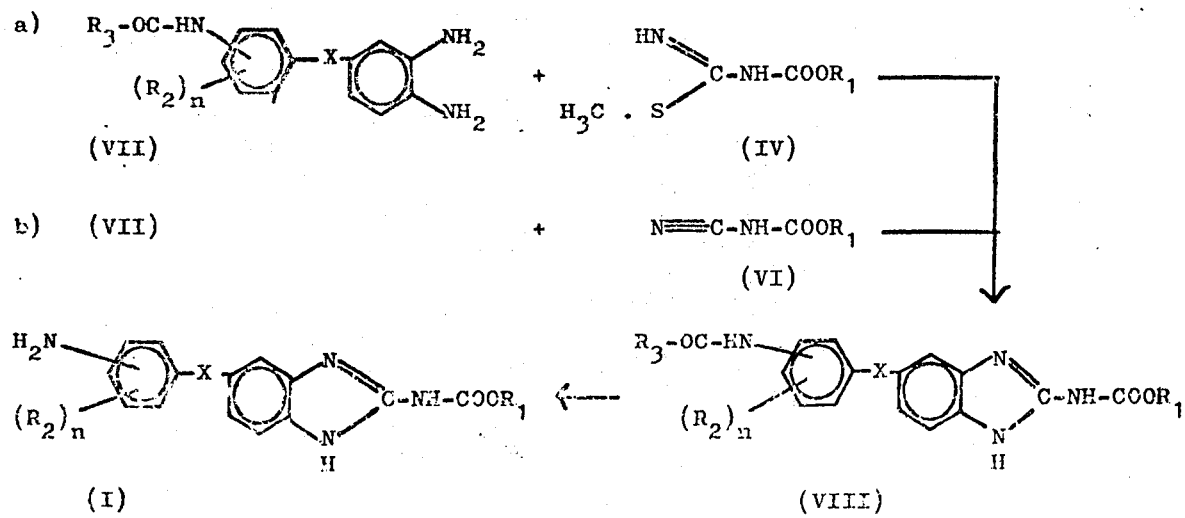

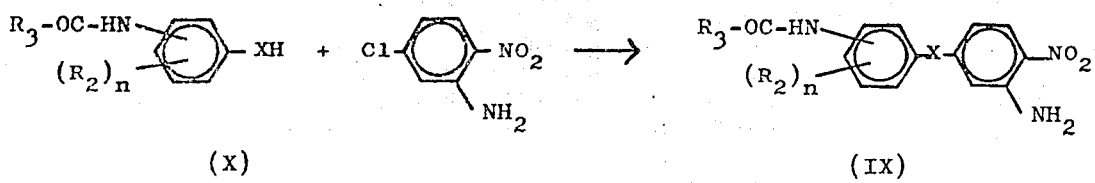

(X)                                               (IX)

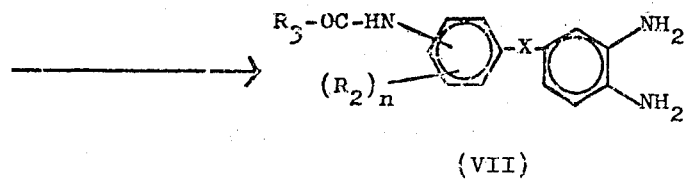

(VII)

To carry out the reaction according to (a) the S-methyl-thio-urea sulfate of the formula (II) and a chloroformic acid ester of the formula (III), wherein $R_1$ has the same meaning as indicated in formula (I), are mixed in water, a strong base, for example a 25% sodium hydroxyde solution, is added dropwise, whereby the temperature is maintained at a low degree, preferably at about 0°C. The alkyl-S-methyl-thio-urea-carboxylate of the formula (IV) need not be isolated.

As chloroformic acid esters there are considered for example the
- chloroformic acid methyl ester,
- chloroformic acid ethyl ester,
- chloroformic acid propyl ester,
- chloroformic acid isopropyl ester,
- chloroformic acid butyl ester,
- chloroformic acid isobutyl ester,
- chloroformic acid tert.-butyl ester.

The pH range of the reaction mixture obtained as described above is then preferably adjusted to a value between 2 and 5, expediently by adding an organic acid such as acetic acid or lactic acid. The o-phenylenediamino-derivative of the formula (VII) is added, either as a free base or as an acid addition salt, for example as hydrochloride. In the latter case it may be advantageous to add an alkali salt of an organic acid as a buffer.

As o-phenylene-diamino derivatives there are considered for example the
- 3,4-diamino-4'-acetamino-diphenyl ether,
- 3,4-diamino-3'-acetamino-diphenyl ether,
- 3,4-diamino-2'-acetamino-diphenyl ether,
- 3,4-diamino-3'-chloro-4'-acetamino-diphenyl ether,
- 3,4-diamino-2'-chloro-4'-acetamino-diphenyl ether,
- 3,4-diamino-3'-methyl-4'-acetamino-diphenyl ether,
- 3,4-diamino-2'-methyl-4'-acetamino-diphenyl ether,
- 3,4-diamino-2'-methyl-5'-acetamino-diphenyl ether,
- 3,4-diamino-3'-methyl-5'-acetamino-diphenyl ether,
- 3,4-diamino-4'-methyl-5'-acetamino-diphenyl ether,
- 3,4-diamino-2'-methyl-3'-acetamino-diphenyl ether,
- 3,4-diamino-2'-bromo-4'-acetamino-diphenyl ether,
- 3,4-diamino-2'-iodo-4'-acetamino-diphenyl ether,
- 3,4-diamino-2'-fluoro-4'-acetamino-diphenyl ether,
- 3,4-diamino-3'-trifluoromethyl-4'-acetamino-diphenyl ether,
- 3,4-diamino-4'-acetamino-diphenylthio ether,
- 3,4-diamino-2'-chloro-4-acetamino-diphenylthio ether,
- 3,4-diamino-2,6-dimethyl-4'-acetamino-diphenyl ether,
- 3,4-diamino-2'-methyl-6'-chloro-4'-acetamino-diphenyl ether,
- 3,4-diamino-4'-propionylamino-diphenyl ether,
- 3,4-diamino-4'-butyrylamino-diphenyl ether,
- 3,4-diamino-4'-trifluoro-acetamino-diphenyl ether.

For reacting the reactants a temperature of from 30° to 100°C is advantageous; the reaction time may be between 30 minutes and 10 hours. Methyl mercaptane is set free as by-product. The 5(6)-acylamino-phenoxy- or -phenylthio-2-benzimidazolyl-carbamic acid alkyl esters of the formula (VIII) are isolated in usual way, for example by diluting the mixture with water and filtering the product precipitated. By this way there are obtained the
- 5-(4-acetamino-phenoxy)-2-benzimidazolyl-carbamic acid methyl ester,
- 5-(3-acetamino-phenoxy)-2-benzimidazolyl-carbamic acid methyl ester,
- 5-(2-acetamino-phenoxy)-2-benzimidazolyl-carbamic acid methyl ester,
- 5-(3-chloro-4-acetamino-phenoxy)-2-benzimidazolyl-carbamic acid methyl ester,
- 5-(2-chloro-4-acetamino-phenoxy)-2-benzimidazolyl-carbamic acid-methyl ester,
- 5-(3-methyl-4-acetamino-phenoxy)-2-benzimidazolyl-carbamic acid methyl ester,
- 5-(2-methyl-4-acetamino-phenoxy)-2-benzimidazolyl-carbamic acid-methyl ester,
- 5-(2-methyl-5-acetamino-phenoxy)-2-benzimidazolyl-carbamic acid-methyl ester,
- 5-(3-methyl-5-acetamino-phenoxy)-2-benzimidazolyl-carbamic acid-methyl ester,
- 5-(4-methyl-5-acetamino-phenoxy)-2-benzimidazolyl-carbamic acid-methyl ester,
- 5-(2-methyl-3-acetamino-phenoxy)-2-benzimidazolyl-carbamic acid-methyl ester,
- 5-(2-bromo-4-acetamino-phenoxy)-2-benzimidazolyl-carbamic acid-methyl ester,
- 5-(2-iodo-4-acetamino-phenoxy)-2-benzimidazolyl-carbamic acid-methyl ester, 5-(3-trifluoromethyl-4'-acetamino-phenoxy)-2-benzimidazolyl-carbamic acid-methyl ester,
5-(4-acetamino-phenylthio)-2-benzimidazolyl-carbamic acid methyl ester,
5-(2-chloro-4-acetamino-phenylthio)-2-benzimidazolyl-carbamic acid-methyl ester,
5-(2,6-dimethyl-4-acetamino-phenoxy)-2-benzimidazolyl-carbamic acid-methyl ester,
5-(2-methyl-6-chloro-4-acetamino-phenoxy)-2-benzimidazolyl-carbamic acid-methyl ester,
5-(4-propionylamino-phenoxy)-2-benzimidazolyl-carbamic acid methyl ester,
5-(2-fluoro-4-acetamino-phenoxy)-benzimidazolyl-carbamic acid methyl ester,
5-(4-butyrylamino-phenoxy)-2-benzimidazolyl-carbamic acid methyl ester,
5-(4-trifluoroacetylamino-phenoxy)-2-benzimidazolyl-carbamic acid methyl ester,
5-(4-acetamino-phenoxy)-2-benzimidazolyl-carbamic acid ethyl ester,
5-(4-acetamino-phenoxy)-2-benzimidazolyl-carbamic acid butyl ester.

The isolated acylamino-phenoxy- or acylamino-phenylthio-benzimidazolyl-carbamic acid alkyl esters of the formula (VIII) are saponified by the action of preferably strong mineral acids such as hydrochloric acid, sulfuric acid, phosphoric acid, preferably at an elevated temperature. By this layer chromatographic control the reaction time is determined in each case, during which the amino group is saponified, but the carbamic acid ester group is not yet touched to a considerable extent. As solvents for this test there are especially suitable mixtures of methylene chloride and chloroform, as eluents mixtures of benzene, acetone and ammonia.

As reaction products there are prepared for example the 5-(4-amino-phenoxy)-2-benzimidazolylcarbamic acid methyl ester,
5-(3-amino-phenoxy)-2-benzimidazolyl-carbamic acid methyl ester,
5-(2-amino-phenoxy)-2-benzimidazolyl-carbamic acid-methyl ester,
5-(3-chloro-4-amino-phenoxy)-2-benzimidazolyl-carbamic acid methyl ester,
5-(2-chloro-4-amino-phenoxy)-2-benzimidazolyl-carbamic acid methyl ester,
5-(3-methyl-4-amino-phenoxy)-2-benzimidazolyl-carbamic acid methyl ester,
5-(2-methyl-4-amino-phenoxy)-2-benzimidazolyl-carbamic acid methyl ester,
5-(2-methyl-5-amino-phenoxy)-2-benzimidazolyl-carbamic acid methyl ester,
5-(3-methyl-5-amino-phenoxy)-2-benzimidazolyl-carbamic acid methyl ester,
5-(4-methyl-5-amino-phenoxy)-2-bennzimidazolyl-carbamic acid methyl ester,
5-(2-methyl-3-amino-phenoxy)-2-benzimidazolyl-carbamic acid methyl ester,
5-(2-bromo-4-amino-phenoxy)-2-benzimidazolyl-carbamic acid methyl ester,
5-(2-iodo-4-amino-phenoxy)-2-benzimidazolyl-carbamic acid methyl ester,
5-(2-fluoro-4-amino-phenoxy)-2-benzimidazolyl-carbamic acid methyl ester,
5-(3-trifluoromethyl-4'-amino-phenoxy)-2-benzimidazolyl-carbamic acid-methyl ester,
5-(4-amino-phenylthio)-2-benzimidazolyl-carbamic acid-methyl ester,
5-(2-chloro-4-amino-phenylthio)-2-benzimidazolyl-carbamic acid-methyl ester,
5-(2,6-dimethyl-4-amino-phenoxy)-2-benzimidazolyl-carbamic acid-methyl ester,
5-(2-methyl-6-chloro-4-amino-phenoxy)-2-benzimidazolyl-carbamic acid methyl ester,
5-(4-amino-phenoxy)-2-benzimidazolyl-carbamic acid ethyl ester,
5-(4-amino-phenoxy)-2-benzimidazolyl-carbamic acid butyl ester, if desired in the form of a salt in each case.

To carry out the reaction according to b), a chloroformic acid ester of the formula (III) is first added to an aqueous suspension of cyanamide in the form of a salt, preferably the calcium salt (V), whereby the reaction temperature is maintained between 40° and 60°C by cooling.

After filtering off dark by-products which have been precipitated the cyanamide carboxylate of the formula (VI) is obtained in the filtrate.

The cyanamide carboxylate thus obtained (VI) is mixed with an o-phenylene-diamino-derivative (VII), and the mixture is adjusted to a pH-value, between 1 and 6, preferably 2 and 4, by addition of a mineral acid, for example concentrated hydrochloric acid. The reaction mixture is then expediently kept between 30° and 100°C, for 30 minutes to 10 hours depending on the reactivity of the o-phenylene-diamino derivative. After cooling the reaction mixture the reaction product precipitated (VIII) is isolated by filtering and washing and saponified to the free amines of the formula (I) as described above.

The o-phenylene-diamino derivative (VII) serving as starting material is obtained by reduction of a corresponding amino-nitro-diphenyl ether of the formula (IX), wherein $R_2$, $R_3$, $n$ and $X$ have the same meaning as in formula (I). The reduction may be carried out for example by hydrogenation in the presence of Raney nickel and a solvent, such as methanol or dimethyl-formamide at temperatures between 20° and 60°C.

The o-phenylene-diamino derivative (VII) may be reacted either as a free amine in the above-indicated way with an alkyl-S-methyl-thio-urea-carboxylate (IV) or with a cyanamide carboxylate (VI), or in the form of the acid addition salt thereof with a suitable mineral or organic acid, such as hydrochloric acid, sulfuric acid, acetic acid, oxalic acid or similar acids.

The amino-nitro-diphenyl ethers (IX) are obtained by reacting a phenol of the formula (X), wherein $R_2$, $R_3$, $n$ and $X$ have the same meaning as indicated in formula (I), with 5-chloro-2-nitro-aniline, expediently in dimethyl formamide in the presence of alkaline agents such as potassium carbonate, at temperatures between 80°C and the boiling point of the solvent used, during a period of from half an hour to 5 hours. The isolation is carried out by diluting the reaction mixture with water and filtering the deposit precipitated.

The products of the invention are valuable chemotherapeutics being suitable for the control of parasitic diseases of human beings and animals. These products have a special activity against Ankylostoma, but especially against other helminths, such as Haemonchus, Ostertaiga, Hyostrongylus, Trichostrongylus, Cooperia and many others. A particularly marked acitivity exists against hook worms which infest above all ruminants and cause considerable damages to health and economy, so that the substances claimed are considered to be used as anthelmintics in human and veterinary medicine.

The active ingredients of formula I are administered together with a suitable pharmaceutical solvent or carrier orally or subcutaneously, the first or second form of administration being preferred according to circumstances.

To test the action of the compounds according to the invention chemotherapeutic experiments are carried out either on dogs or on sheeps. The dogs are infested by way of experiment with larvae of Ancyclostoma canium, the sheeps with larvae of *Haemonchus contorsus* and *Trichostrongylus colubriformis*. The test animals are kept in flagged boxes which are thoroughly cleaned every day to avoid super-infections. After termination of the prepatency period (time between infestation and pubescence of the parasites with beginning excretion of eggs and larvae) the egg number per gram of faeces is determined by an improved McMaster-process (s. Tierarztl. Umschau 6, 209–210, (1951)). Immediately after that, the animals, generally 4 to 3 animals per group, at least two, are treated orally or subcutaneously, whereby a suspension of 0,5 to 10,0 mg/kg of body weight in 10 ml of a 1% tylose suspension is applied in each case. On the 7th, 14th and 28th day after the treatment the egg number per gram of faeces is determined again and the modification in percent thereof as compared to the initial value before the treatment is calculated. In the case of a convincing success the test animals are subjected to autopsy and the alimentary tract is examined to find optionally present nematodes.

The following Table lists anthelmintic activities of certain substances of the invention claimed which were determined according to the test method described above. As a comparison there is mentioned the anthelmintic activity of two known compounds having a similar structure.

| Product of the invention according to Example | Dose mg/kg | anthelmintic effect - hook worms - |
|---|---|---|
| 1 | 10 | 100 % |
| 2 | 10 | 100 % |
| 4 | 15 | 80 % |
| 3 | 15 | 80 % |
| 5 | 15 | 80 % |
| 6 | 15 | 100 % |
| Thiabendazols[1] | 500 | 82 % |
| Parbendazols[2] | 100–200 | 77–93 % |

[1]Novilla, and R. F. Flauta (1967), Philipp. J. Vet. Med. 6, 135–144.
[2]Theodorides, V. J. and M. Laderman (1968), Vet. Med. u. Small Vet. Pract. 63, 985.

The Examples listed in the Table show the superiority of the products described and claimed in contradistinction to comparative preparations.

Depending on the case, the active ingredients of the formula I are administered for 1 to 14 days in dosage units between 0.5 and 50 mg per kg of body weight.

For oral administration there are considered tablets, dragees, capsules, powders, granules or pastes which contain the active ingredients together with usual carriers and auxiliaries such as starch, cellulose powder, talcum, magnesium stearate, sugar, gelatin, calcium carbonate, finely divided silicic acid, carboxy methyl cellulose or similar substances.

For parenteral administration there are considered sterile solutions, for example oily solutions which are prepared by using sesame oil, castor oil or synthetic triglycerides, if desired with addition of tocopherol as antioxydant and/or by using surface-active agents such as sorbitane-fatty acid esters. There may also be used aqueous suspensions which are prepared by using ethoxylated sorbitane-fatty acid esters, if desired with the addition of thickeners, as for example polyethyleneglycol or carboxymethyl cellulose.

The concentrations of the active ingredients according to the invention in the compositions prepared therewith preferably range between 2 and 20 percent by weight for the use as veterinary medicament; for the use as human medicament the concentrations of the active ingredients preferably range between 20 and 80 percent by weight.

The following Examples illustrate the invention.

EXAMPLE 1

166 G of S-methyl-thiourea-sulfate were dissolved in 435 ml of water and 77 ml of chloroformic acid methyl ester and then 356 g of a 25% sodium hydroxide solution were added dropwise while stirring at a temperature of less than 20°C. Stirring was continued for 20 minutes and the reaction mixture was then mixed with 700 ml of water and 120 ml of glacial acetic acid; after adding a solution of 154 g of crude 3,4-diamino-4'-acetamino-diphenyl ether in a mixture of 500 ml of isopropanol and 300 ml of dimethylformamide the mixture was stirred for 90 minutes at 80°C, the methylmercaptane being split off. The whole was allowed to cool, and after cooling in ice the deposit precipitated was suction-filtered.

By recrystallization from 2.75 l of glacial acetic acid 130 g of pure 5-(4-acetamino-phenoxy)-2-benzimidazolyl-carbamic acid methyl ester having a melting point of 292°C (decomposition) were obtained.

This compound was refluxed in 650 ml of 2N hydrochloric acid for 90 minutes. After addition of coal the mixture was filtered hot and by addition of sodium acetate the free 5-(4-amino-phenoxy)-2-benzimidazolyl-carbamic acid methyl ester was precipitated which was filtered after cooling. Yield: 70 g having a melting point of 245°C (decomposition). For purification there may be recrystallized from dimethyl-sulfoxide/methanol.

To prepare the 3,4-diamino-4'-acetamino-diphenyl ether required as intermediate product 151 g of 4-acetamino-phenol in 500 ml of dimethylformamide were refluxed for four hours with 148 g of $K_2CO_3$ and 173 g of 5-chloro-2-nitraniline. After cooling the reaction mixture was diluted with 500 ml of water and the deposit precipitated was filtered from 3-amino-4-nitro-4'-acetamino-diphenyl ether.

After recrystallization from methylglycol this compound was obtained in a pure form with a yield of 172 g and a melting point of 213°C.

172 G of the 3-amino-4-nitro-4'-acetamino-diphenyl ether described above were hydrogenated in 500 ml of isopropanol with Raney nickel under normal pressure and room temperature and the filtrate which contained 154 g of 3,4-diamino-4'-acetamino-diphenyl ether was used for the reaction with S-methylthio-urea-sulfate after addition of 300 ml of dimethylformamide.

In analogous manner the following compounds were prepared from 5-chloro-2-nitraniline, whereby the successive reaction steps and their reaction products are pointed out by aliphatic order.

EXAMPLE 2

From 4-acetamino-thiophenol via
a. 3-amino-4-nitro-4'-acetamino-diphenyl-thioether (melting point 177°C)

b. 3,4-diamino-4'-acetamino-diphenyl-thioether (directly further processed as crude product)

c. 5-(4-acetamino-phenylthio)-2-benzimidazolyl-carbamic acid methyl ester (melting point 268°C (decomposition))

the 5-(4-amino-phenylthio)-2-benzimidazolyl-carbamic acid methyl ester (melting point 249°C (decomposition)) was obtained.

EXAMPLE 3

From 3-acetamino-phenol via a. 3-amino-4-nitro-3'-acetamino-diphenyl ether (melting point 187°C)

b. 3,4-diamino-3'-acetamino-diphenyl ether (directly further processed as crude product)

c. 5-(3-acetamino-phenoxy)-2-benzimidazolyl-carbamic acid methyl ester (melting point 285°C (decomposition)

the 5-(3-amino-phenoxy)-2-benzimidazolyl-carbamic acid methyl ester (melting point 275°C (decomposition)) was obtained.

EXAMPLE 4

From 4-acetamino-2-hydroxy-toluene via a. 3-amino-4-nitro-2'-methyl-5'-acetamino-diphenyl ether (melting point 186°C)

b. 3,4-diamino-2'-methyl-5'-acetamino-diphenyl ether (directly further processed as crude product)

c. 5-(2-methyl-5-acetamino-phenoxy)-2-benzimidazolyl-carbamic acid methyl ester (melting point 154°C (decomposition)) the 5-(2-methyl-5-amino-phenoxy)-2-benzimidazolyl-carbamic acid methyl ester (melting point 280°C (decomposition)) was obtained.

EXAMPLE 5

From 2-chloro-4-acetamino-phenol via a. 3-amino-4-nitro-2'-chloro-4'-acetamino-diphenyl ether (melting point 143°C)

b. 3,4-diamino-2'-chloro-4'-acetamino-diphenyl ether (directly further processed as crude product)

c. 5-(2-chloro-4-acetamino-phenoxy)-2-benzimidazolyl-carbamic acid methyl ester (melting point 290°C (decomposition)) the 5-(2-chloro-4-amino-phenoxy)-2-benzimidazolyl-carbamic acid methyl ester (melting point 287°C (decomposition)) was obtained.

EXAMPLE 6

From 3-chloro-4-acetamino-phenol via a. 3-amino-4-nitro-3'-chloro-4'-acetamino-diphenyl ether (melting point 168°C)

b. 3,4-diamino-3'-chloro-4'-acetamino-diphenyl ether (directly further processed as crude product)

c. 5-(3-chloro-4-acetamino-phenoxy)-2-benzimidazolyl-carbamic acid methyl ester (melting point 299°C (decomposition))

the 5-(3-chloro-4-amino-phenoxy)-2-benzimidazolyl-carbamic acid methyl ester (melting point 280°C (decomposition)) was obtained.

What we claim is:

1. A 2-carbalkoxy-amino-benzimidazolyl-5(6)-aminophenyl ether of the formula

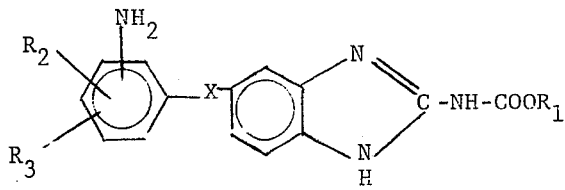

wherein $R_1$ is alkyl of 1 to 4 carbon atoms, $R_2$ and $R_3$, independently of one another, represent hydrogen, alkyl of 1 to 4 carbon atoms, hydroxyl, alkoxy of 1 to 4 carbon atoms, halogen or trifluoromethyl, and X is oxygen or sulfur, and the salt thereof with a physiologically tolerable acid.

2. The compound of claim 1 which is 5-(4-aminophenoxy)-2-benzimidazolyl-carbamic acid methyl ester.

3. The compound of claim 1 which is 5-(4-aminophenylthio)-2-benzimidazolyl-carbamic acid methyl ester.

4. The compound of claim 1 which is 5-(3-aminophenoxy)-2-benzimidazolyl-carbamic acid methyl ester.

5. The compound of claim 1 which is 5-(2-methyl-5-aminophenoxy)-2-benzimidazolyl-carbamic acid methyl ester.

6. The compound of claim 1 which is 5-(2-chloro-4-aminophenoxy)-2-benzimidazolyl-carbamic acid methyl ester.

7. The compound of claim 1 which is 5-(3-chloro-4-aminophenoxy)-2-benzimidazolyl-carbamic acid methyl ester.

* * * * *